(12) United States Patent
Doutre et al.

(10) Patent No.: US 11,915,473 B2
(45) Date of Patent: Feb. 27, 2024

(54) HYBRID OPERATION OF LICENSE PLATE RECOGNITION (LPR) CAMERA FOR INFRASTRUCTURE MONITORING

(71) Applicant: MOTOROLA SOLUTIONS, INC., Chicago, IL (US)

(72) Inventors: Barbara R Doutre, Plantation, FL (US); Yanyan Hu, Andover, MA (US); Deborah A Gruenhagen, Southwest Ranches, FL (US); Scott M Alazraki, Davie, FL (US); Steven Gilmore, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 162 days.

(21) Appl. No.: 17/457,682

(22) Filed: Dec. 6, 2021

(65) Prior Publication Data
US 2023/0177827 A1    Jun. 8, 2023

(51) Int. Cl.
| | |
|---|---|
| *G06V 10/96* | (2022.01) |
| *G06V 20/62* | (2022.01) |
| *G06V 20/56* | (2022.01) |
| *G06V 20/52* | (2022.01) |
| *G06T 7/00* | (2017.01) |
| *G06V 10/80* | (2022.01) |

(Continued)

(52) U.S. Cl.
CPC ........... *G06V 10/96* (2022.01); *G06Q 30/018* (2013.01); *G06T 7/0002* (2013.01); *G06V 10/803* (2022.01); *G06V 20/52* (2022.01); *G06V 20/56* (2022.01); *G06V 20/625* (2022.01); *H04N 7/181* (2013.01); *G06T 2207/30184* (2013.01); *G06T 2207/30232* (2013.01); *G06T 2207/30252* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,443,152 B2 | 9/2016 | Atsmon et al. | |
| 9,916,755 B1 * | 3/2018 | Ratti | G08G 1/0112 |

(Continued)

FOREIGN PATENT DOCUMENTS

| | | | |
|---|---|---|---|
| KR | 102026567 B1 | 9/2019 | |
| WO | WO-2020223519 A1 * | 11/2020 | B64C 39/024 |

OTHER PUBLICATIONS

Griffith, David: "12 Things You Need to Know About LPR", https://www.policemag.com/342447/12-things-you-need-to-know-about-lpr[Oct. 22, 2021 5:00:17 AM], downloaded from the internet: Oct. 22, 2021, all pages.

*Primary Examiner* — Gelek W Topgyal
(74) *Attorney, Agent, or Firm* — Barbara R. Doutre

(57) ABSTRACT

A hybrid operation of a license plate recognition (LPR) system and infrastructure monitoring is provided. The system takes advantage of a first mode of operation of the LPR system, by running an infrastructure analytical tool which gathers infrastructure images in parallel with license plate detection. Analytics are applied, via a cloud based analytics engine, to provide detection of infrastructure anomalies, and prediction of potential infrastructure incidents. The system further generates a trigger alert warning of a potential infrastructure incident and recommendation to address the potential infrastructure incident.

19 Claims, 2 Drawing Sheets

(51) Int. Cl.
 *G06Q 30/018* (2023.01)
 *H04N 7/18* (2006.01)
 *H04L 67/12* (2022.01)

(56) References Cited

U.S. PATENT DOCUMENTS

| | | |
|---|---|---|
| 2005/0116833 A1 | 6/2005 | Miller |
| 2014/0195068 A1* | 7/2014 | Boss ................ G08G 1/096775 |
| | | 701/1 |
| 2015/0248595 A1* | 9/2015 | Khan ................... G08G 1/0175 |
| | | 382/105 |
| 2016/0217226 A1 | 7/2016 | Westcott |
| 2016/0379487 A1* | 12/2016 | Voeller ................... H04N 23/60 |
| | | 340/937 |
| 2019/0043201 A1* | 2/2019 | Strong ................... G06V 10/96 |
| 2020/0211376 A1 | 7/2020 | Roka |
| 2020/0336541 A1* | 10/2020 | Naderi Alizadeh ..... H04L 67/01 |
| 2021/0049363 A1* | 2/2021 | Freitas Cunha ...... H04W 4/029 |
| 2023/0049184 A1* | 2/2023 | Alakarhu .................. B60S 1/04 |

* cited by examiner

HYBRID OPERATION OF LICENSE PLATE RECOGNITION (LPR) CAMERA FOR INFRASTRUCTURE MONITORING

FIELD OF THE INVENTION

The present invention relates generally to license plate recognition (LPR) systems and more particularly to expanding the application of LPR systems to other applications.

BACKGROUND OF THE INVENTION

License plate recognition (LPR) technology is widely used by law enforcement agencies to identify stolen vehicles, illegally parked vehicles, expired registrations, and vehicles that may have warrants associated with them. The use of LPR cameras has extended into other agencies and businesses, such as tow truck companies that may use LPR cameras to facilitate retrieval of repossessed vehicles. Technologists continue to seek out new ways to apply LPR technology, particularly where the application can be a benefit to the general public.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
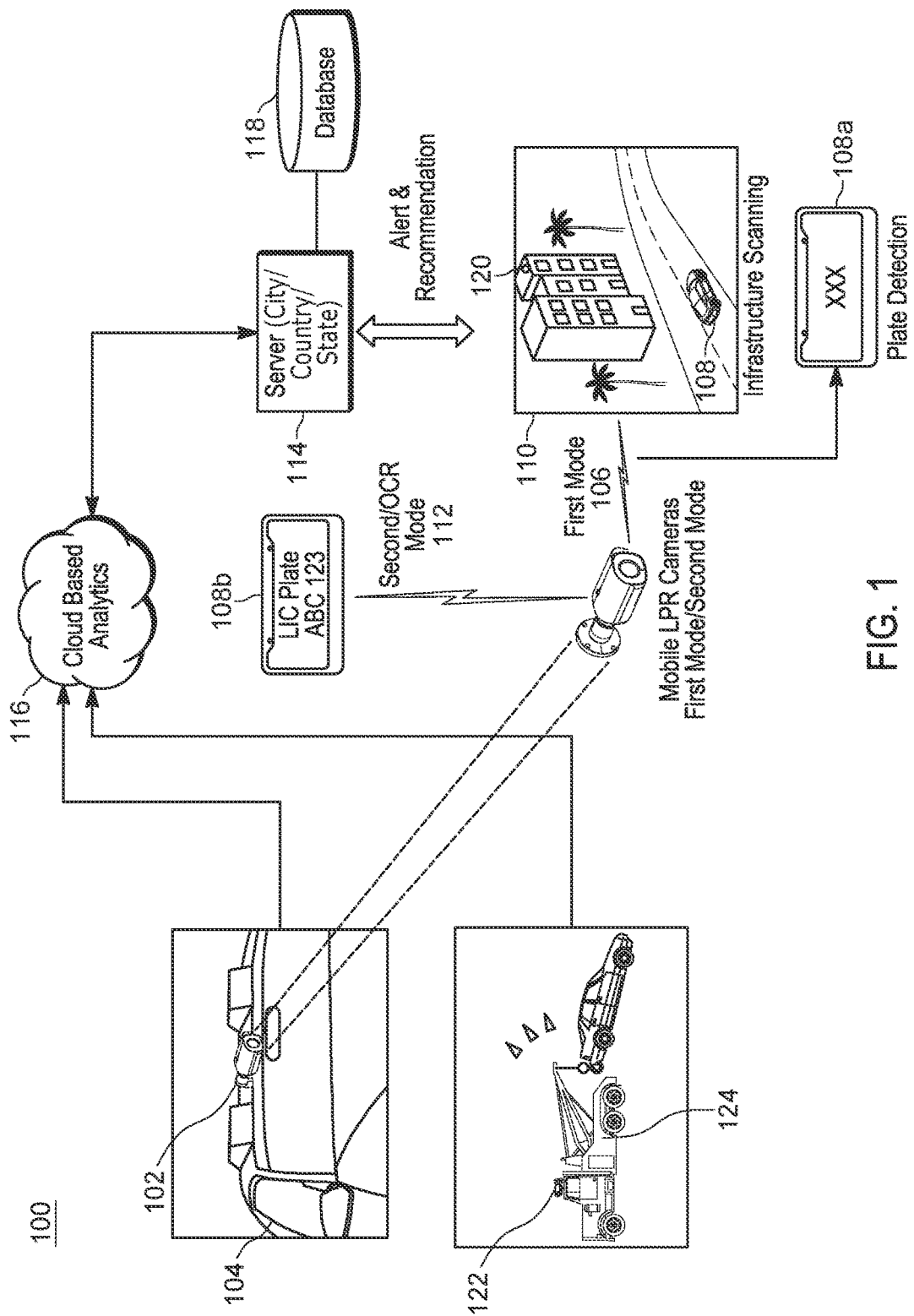
FIG. 1 is a block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An LPR system generally consists of optical character recognition software, analytical software, databases, and cameras with infrared and visible light spectrum imaging capability. Currently, LPR cameras mounted on vehicles as dash cams have two modes of operation. The first mode of operation detects the presence of a license plate, and the second mode of operation performs optical character recognition (OCR) of the detected plate. The first mode takes little analytical bandwidth, while the second mode takes significant analytical bandwidth. These cameras are mounted in various types of vehicles, such as law enforcement vehicles, tow trucks, repo-cars/trucks, to name a few. The embodiments provided herein extend and take advantage of the processing capability of the first mode of operation.

Briefly, there is provided herein a hybrid operation of a license plate recognition (LPR) system for infrastructure monitoring. For the purposes of this application, the term infrastructure pertains to city, town, building, road, bridges and landscape types of infrastructure or other infrastructure capable of being scanned by a camera mounted to a vehicle. The proposed system takes advantage of the first mode of operation of the LPR system, by running an infrastructure analytical tool which gathers infrastructure images in parallel with license plate detection. Analytics are applied, via a cloud based analytics engine, to provide detection of infrastructure anomalies, and prediction of potential infrastructure incidents. The system further generates a trigger alert warning of the potential infrastructure incident (e.g. predict bridge collapse, predict building damage, predict potential road impasse from tree limb and/or other potentially dangerous conditions), as well as recommendation. The system can further perform periodic analysis of current and stored infrastructure information to identify maintenance issues before such issues become problematic. The system described herein provides more than just a repurposing of a camera, as the embodiments extend into smart city infrastructure monitoring, detection, prediction, trigger alerts, recommendations, and potential subscription revenue. The embodiments further extend the functionality of devices already present in certain vehicles, such as on tow truck and repo vehicles with an additional potential revenue stream when operated as a subscription.

FIG. 1 is a block diagram of a communication system 100 formed in accordance with some embodiments. The communication system 100 includes a mobile license plate recognition (LPR) camera system 102 mounted to a vehicle 104. Vehicle 104 may be a public safety vehicle, such as a law enforcement vehicle or other vehicle having an LPR system 122 mounted thereto, such as a tow truck service 124. The mobile LPR camera system 102 may comprise one or more cameras. For example, on a patrol vehicle, the LPR system may comprise one forward facing camera and one rear facing camera. Some agencies may use four cameras per vehicle for enhanced coverage. The mobile LPR system, in accordance with some embodiments, operates via a first operating mode 106 providing simultaneous scanning for plate detection, such as detection of a license plate 108, and infrastructure video scanning, such as scanning of city infrastructure 110. The simultaneous scanning for plate detection and infrastructure video scanning will also be referred to as a hybrid operating mode. The hybrid operating mode may be operated by city owned vehicles, such as law enforcement vehicles having LPR systems, as part of a smart city application and/or provided as part of a subscription service to non-city owned, pre-approved vehicles having LPR systems, such as tow truck companies and other non-city agencies. The infrastructure video scans of the hybrid mode may be sold by to the city to enable additional city infrastructure analytics to be performed. Hence, the infrastructure video feeds obtained during the hybrid operating mode can provide a source of additional revenue to non-city agencies.

The mobile LPR camera system 102 further provides a second operating mode 112 providing optical character recognition (OCR) operation triggered by detection of a license plate during the first operating mode. License plate 108 is shown, for illustrative purposes, as a detected license plate 108a (as part of first mode of operation) and an OCR identified license plate 108b (as part of the second mode of operation). The mobile LPR camera system 102 comprises a processor to perform the OCR on a detected plate during the second mode of operation. In accordance with the embodiments, the processor is repurposed during the first mode of operation to process the scanned video images and generate infrastructure image data. The infrastructure scanning in addition to license plate detection takes place when no processable license plate is detected in a field of view (FOV) of the LPR imaging devices. Both baseline non-movable images and movable images may be collected in parallel while the vehicle is in motion with simultaneous scanning for plate detection during the first mode of operation.

The communication system 100 further comprises a server 114 associated with managing and coordinating maintenance of the infrastructure. For example, the server 114 may be part of a city, county and/or state server or even a private server associated with monitoring infrastructure and the management of the subscription based service. The server 114 may comprise or be interoperable with an analytics engine, such as cloud based analytics engine 116, and a database 118. The database 118 may reside within or outside of the server 114 and/or communicate via wired or wireless communications with the server. As part of the hybrid operating mode, the LPR system uploads video data pertaining to the scanned images to the cloud based analytics engine 116 for comparison to baseline data and detection of anomalies. Comparison results of baselines and current video scans may identify infrastructure anomalies, such as graffiti, abnormal staining on roads, sidewalk or buildings, rust, pot holes, cracks in buildings and sidewalks, broken street lights and signs, clogged drainage, and structural building changes that may not have been approved by the city, to name a few.

The analytics engine 116 aggregates the infrastructure video data for comparison to previously acquired baseline infrastructure data and generates predictive analytics in response to infrastructure anomalies detected as a result of the comparisons. The analytics engine 116 triggers an alert with a recommended action to address the infrastructure anomaly based on the predictive analytics. The server 114 communicates the infrastructure alert to appropriate city departments and/or private owners of infrastructure. The baseline data, current scanned data, detected anomalies, predicted analytics, triggers, and recommendations may be stored in database 118 for future comparison analysis and used for determination of recommendations.

The server 114 may further instruct the analytics engine 116 to perform periodic checks on the data stored in the database 118 to determine if any patterns of infrastructure deterioration are occurring over time. The ability to scan the infrastructure when the OCR function of the LPR system is not in use, allows for a strong baseline of infrastructure data to be acquired, checks for current anomalies, and periodic checks on the stored data to identify patterns of slower occurring infrastructure changes. The triggered alerts and recommendations allow for corrective actions to be acted upon by city departments and/or private owners of infrastructure alerted by the city.

The analytics engine 116 may further determine type and severity of the anomaly, and assigns (or not) the trigger alert based on the severity. The analytics engine advantageously detects potential unapproved changes to an infrastructure based on anomalies detected during the comparison and generates a recommendation accompanying the triggered alert which may comprise, for example, a recommendation to verify building permits pulled on the infrastructure.

While the vehicle 104 having LPR camera system 102 is in motion, the detection of infrastructure and the analytics pertaining thereto will be based on moving scanned videos taking place within the field of view of the camera. While the LPR vehicle is parked, the detection of infrastructure and the analytics pertaining thereto take place within the field of view (FOV) of the camera system to gather stationary infrastructure analytics. The embodiments may further be supplemented by providing for an automated rotational movement of one or more cameras to focus on surrounding infrastructure when the vehicle is parked, taking a scan or sweep of road conditions, light poles, and other infrastructure. This provides a strong baseline set of infrastructure data which can be used for comparisons with the scanned data acquired during motion of the vehicle.

The embodiments may further be supplemented by providing for an automated rotational movement of one or more cameras to focus on surrounding infrastructure when the vehicle is parked, taking a scan or sweep of road conditions, light poles, and other infrastructure within the camera field of view. The stationary vehicle readings provide a strong baseline set of data which can be used for comparisons with the scanned data acquired during motion of the vehicle.

In further embodiments, the server 114 may further supplement the system by setting up a geofence within which to gather more focused stationary analytics on an infrastructure of particular interest within a predetermined location. For example, a particular portion of a building, such as entryway stairs and entry ramps, may be of particular interest as opposed to the surrounding areas. The mobile LPR camera system 102 and/or the vehicle 104 may further comprise a location tracking module, such as a global position system (GPS) module, to establish "where" the vehicle is parked, and establish the geofence for structure(s) of particular interest within the geofence. The geofence advantageously allows for supplemental detailed infrastructure analytics.

In some embodiments, the infrastructure video scanning may further be combined with infrastructure data reception acquired from sensors 120 mounted on or near infrastructure, such as buildings, walls, bridges, and traffic poles, to name a few. Sensors 120 may include, but are not limited to, one or more of temperature sensors, surface deflection sensors, strain gauges, and rainfall sensors, to name a few. In this case, the analytics engine 116 aggregates video and sensor data to generate the predictive analytics, trigger the alert, and generate the recommended action. The server 114 may upload the infrastructure sensor data to be aggregated with the infrastructure video scanning data to the cloud based analytics engine 116. For example, a sensor that detects moisture at a certain location of the infrastructure, cross-referenced, compared to images at that infrastructure location to further verify if a crack exists, is enlarging, and/or over periodic checks may be indicative of a cracked water line. Thus, sensor data can be incorporated into the communication system 100 for improved analytics, verification, and prediction.

The communication system 100 can be incorporated into vehicles having LPR systems, such as law enforcement vehicles, tow trucks, and repo-trucks. These service vehicles can now extend their LPR system to acquire infrastructure data without impacting their primary LPR functionality. A city may offer incentives for example, via a subscription service, for tow truck drivers to incorporate the infrastructure scanning feature into their vehicles.

Figure 2:
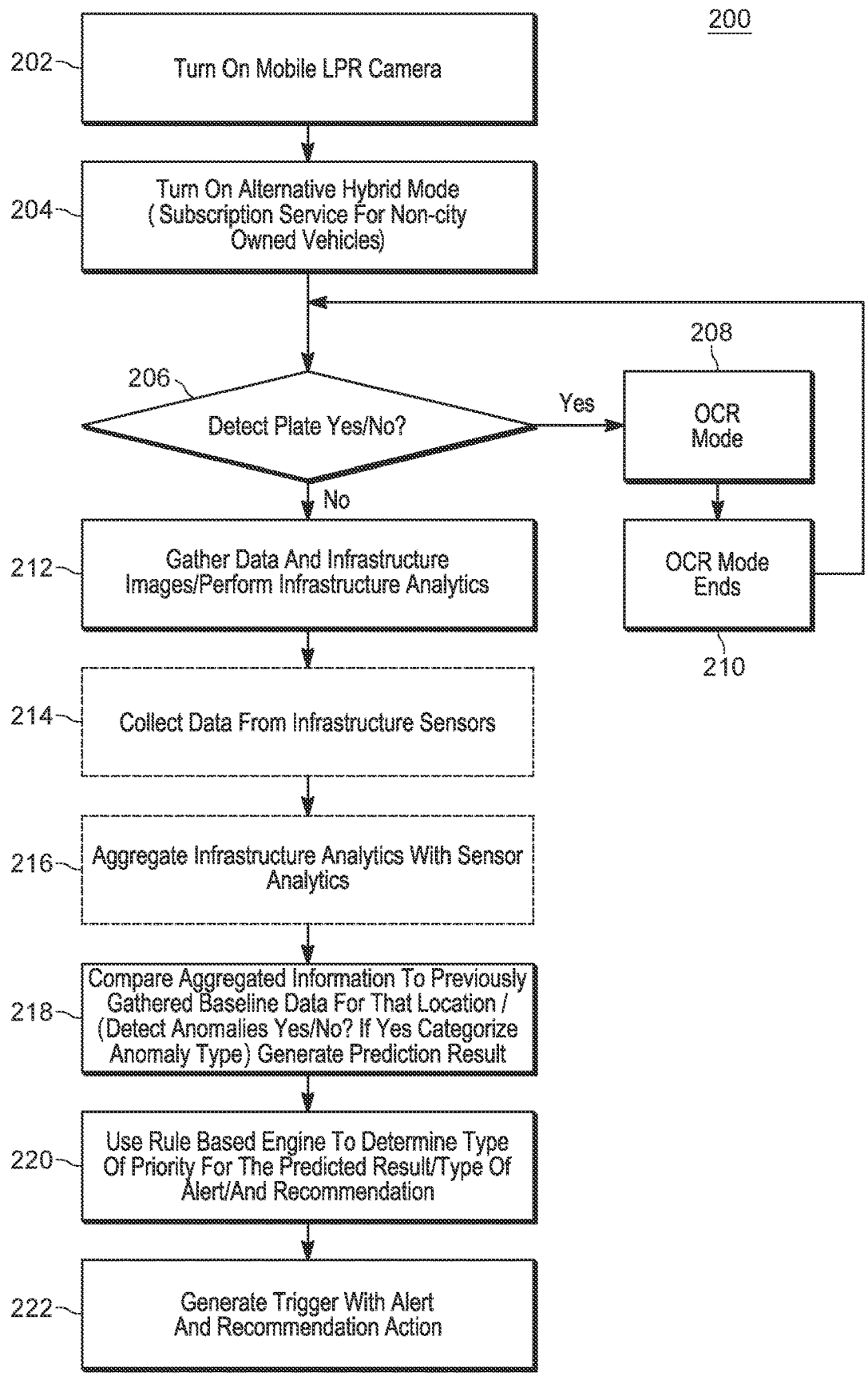
FIG. 2 is a flowchart of a method for operating the communication system of FIG. 1 in accordance with some embodiments.

FIG. 2 is a flowchart of a method 200 for monitoring city infrastructure in accordance with some embodiments. The method begins by enabling a mobile license plate recognition (LPR) camera system of a vehicle at 202 and turning on simultaneous scanning for plate detection and city infrastructure video scanning as part of an alternative hybrid monitoring mode at 204. Law enforcement vehicles or other city owned vehicles having LPR system may operate the alternative hybrid monitoring mode as part of a smart city application which benefits the city. The alternative hybrid monitoring mode may also be provided as a subscription service to non-law enforcement, non-city owned vehicles having LPR systems. For example, tow trucks can sell video feeds to the city as a subscription service.

In response to a license plate being detected at 206, the method continues by entering an optical character recognition (OCR) mode at 208, and the method will remain there until the OCR is complete, and the method returns to license plate detection back at 206.

In response to a license plate not being detected at 206, the method continues by entering an infrastructure analytics mode at 212. During the infrastructure analytics mode at 212 the method acquires infrastructure images by the LPR camera system and performs infrastructure analytics, by an analytics engine, on the gathered infrastructure images.

In some embodiments, the method 200 may further, at 214, collect, during the infrastructure analytics mode, in addition to the infrastructure images, sensor data from infrastructures sensors in proximity to the LPR system. The method may then also, at 216, aggregate, by the analytics engine, the infrastructure images and the sensor data. The sensor collection and analytics are optional additions to the method.

With infrastructure data alone, the method continues at 218 by comparing the infrastructure data to previously gathered infrastructure baseline data to detect anomalies and generate, by the analytic engine, predictive analytics in response to the infrastructure anomalies detected as a result of the comparisons.

In embodiments which use infrastructure data and sensor data, the aggregated data of 216 is used for the comparison and generation of the predictive analytics at 218. The processing capability of the LPR system processor is used to acquire the images and collect the sensor data, and then have the analytics performed by the cloud based analytics engine.

A rules based portion of the analytics engine can determine priority at 220 based on the prediction and determine a recommended action for addressing the predicted result. The method at 222 continues by generating a trigger, by the analytics engine, containing an alert with a recommended action based on the predictive analytics.

The system and method provided by the embodiments can be used in a variety of infrastructure applications and is well suited to being incorporated into vehicular systems which already perform LPR monitoring, In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication system, comprising:
a mobile license plate recognition (LPR) camera system having a first operating mode providing simultaneous scanning for plate detection and city infrastructure video scanning and a second operating mode providing optical character recognition (OCR) operation triggered by detection of a license plate during the first operating mode;
an analytics engine generating, during the first operating mode, infrastructure video data from the scanned infrastructure video for comparison to baseline infrastructure data, the analytics engine generating predictive analytics in response to infrastructure anomalies detected as a result of the comparison;
the analytics engine triggering an alert with a recommended action based on the predictive analytics; and wherein the analytics engine detects potential unapproved changes to an infrastructure, and the triggered alert further comprises verifying building permits pulled on the infrastructure.

2. The communication system of claim 1, wherein city infrastructure video scanning takes place during non-plate detection and non-OCR operation.

3. The communication system of claim 1, wherein the city infrastructure video scanning is provided as a smart city application to law enforcement vehicles having LPR camera systems, and the city infrastructure video scanning is provided as a subscription based smart city application to non-law enforcement vehicles having LPR camera systems.

4. The communication system of claim 1, wherein the mobile LPR camera system comprises processor controlled camera devices, and the processor controlled camera devices are repurposed for the city infrastructure video scanning in addition to license plate detection when no processable license plate is detected in a field of view (FOV) of the LPR cameras.

5. The communication system of claim 1, wherein the city infrastructure video scanning is combined with city infrastructure data reception acquired from sensors mounted on city infrastructure; and the analytics engine aggregates video and sensor data to generate the predictive analytics, trigger the alert, and recommended the action.

6. The communication system of claim 1, wherein the LPR system comprises a processor to perform the OCR on a detected plate during the second operating mode, and the processor is repurposed during the first operating mode to process infrastructure image data and city infrastructure sensor data.

7. The communication system of claim 1, wherein both baseline non-movable images and movable images are collected in parallel with simultaneous scanning for plate detection during the first operating mode.

8. The communication system of claim 1, wherein the analytics engine determines type and severity of the infrastructure anomalies.

9. The communication system of claim 8, wherein the alert is triggered based on severity of the infrastructure anomaly.

10. The communication system of claim 9, further comprising:
a server interoperable with the analytics engine for identifying infrastructure anomalies, the server communicating the alert with recommended action to an appropriate city department or private owner of infrastructure; and
a database for storing baseline data associated with the infrastructure, and for storing anomalies identified by the analytics engine and communicated to the server, and for maintaining a record of trigger alerts and recommendations.

11. The communication system of claim 1, further comprising:
a server establishing a geofence within which to gather stationary analytics on an infrastructure of particular interest.

12. The communication system of claim 1, wherein the LPR camera system includes stationary and automated rotational cameras.

13. The communication system of claiml, wherein the LPR system performs city infrastructure video scanning during both mobile and parked vehicle modes.

14. A method for monitoring city infrastructure, comprising;
enabling a mobile license plate recognition (LPR) camera system of a vehicle;
turning on simultaneous scanning for plate detection and city infrastructure video scanning as part of an alternative hybrid monitoring mode;
in response to a license plate being detected, entering an object recognition (OCR) mode;
in response to a license plate not being detected, performing infrastructure analytics by an analytics engine by:
acquiring infrastructure images by the LPR camera system;
performing infrastructure analytics on the acquired infrastructure images to generate infrastructure data;
comparing the infrastructure data to previously gathered infrastructure baseline data to detect infrastructure anomalies;
generating predictive analytics in response to the infrastructure anomalies detected as a result of the comparison;
triggering an alert with a recommended action based on the predictive analytics; and
wherein the analytics engine detects potential unapproved changes to an infrastructure, and the triggered alert further comprises verifying building permits pulled on the infrastructure.

15. The method of claim 14, further comprising:
in response to a license plate being detected after entering the alternative hybrid monitoring mode, returning to the OCR mode.

16. The method of claim 14, wherein the alternative hybrid monitoring mode is operated by law enforcement vehicles or other city owned vehicles having LPR camera systems as part of a smart city application.

17. The method of claim 14, wherein the alternative hybrid monitoring mode is operated as a subscription service by non-law enforcement, non-city owned vehicles having LPR camera systems.

18. The method of claim 14, wherein the alternative hybrid monitoring mode is operated by law enforcement vehicles or other city owned vehicles having LPR camera systems as part of a smart city application, and the alternative hybrid monitoring mode is further operated as part of a subscription service by non-law enforcement, non-city owned vehicles having LPR camera systems as part of a subscription service.

19. The method of claim 14, further comprising;
collect, during the infrastructure analytics mode, in addition to the infrastructure images, sensor data from infrastructures sensors in proximity to the LPR system; and
aggregating, by the analytics engine, the infrastructure images and the sensor data, to generate the predictive analytics, and triggered alert with recommendation.

\* \* \* \* \*